Patented Dec. 10, 1946

2,412,230

UNITED STATES PATENT OFFICE 2,412,230

ALKYLATION OF AROMATIC HYDROCARBONS

Raymond E. Schaad, Chicago, Ill., assignor to Universal Oil Products Company, Chicago, Ill., a corporation of Delaware No Drawing. Application July 18, 1942, Serial No. 451,471

19 Claims. (Cl. 260—671)

This is a continuation-in-part of my co-pending application Serial No. 396,163, filed May 31, 1941.

This invention relates to the treatment of aromatic hydrocarbons to produce alkylated aromatic hydrocarbons. More specifically it is concerned with the production of mono-alkylated and poly-alkylated aromatic hydrocarbons in the presence of a catalyst.

It is recognized that in general the catalytic alkylation of aromatic hydrocarbons has been known for some time. However, the present invention differentiates from the prior art on this subject in the use of a particular catalytic material comprising as its active ingredient a pyrophosphate of a heavy metal selected from the members of the right-hand column of group I of the periodic table.

In one specific embodiment, the present invention relates to a process for producing alkylated aromatic hydrocarbons which comprises subjecting an aromatic hydrocarbon and an alkoxy compound to contact under alkylating conditions in the presence of a catalyst comprising as its active ingredient a pyrophosphate of a heavy metal selected from the members of right-hand column of group I of the periodic table, and preferably a pyrophosphate of copper and silver.

Aromatic hydrocarbons, such as benzene, toluene, other alkyl benzenes, naphthalene, alkyl naphthalenes, and other poly-nuclear aromatic hydrocarbons, which are alkylated by alkoxy compounds comprising alcohols, ethers, and esters as hereinafter set forth, may be obtained by the distillation of coal; by the dehydrogenation and/or cyclization of aliphatic hydrocarbons, alkylated aromatic hydrocarbonds, and alkylated naphthenic hydrocarbons; and by other means.

Alkoxy compounds utilizable as alkylating agents in the process of the present invention comprises organic compounds of the class consisting of alcohols, ethers, and esters. These alkoxy compounds may be represented by the general formula: ROQ, wherein R corresponds to an alkyl radical, O represents an oxygen atom, and Q corresponds to a member selected from the group consisting of hydrogen, a hydrocarbon radical such as alkyl, aryl or naphthyl, and an acid group particularly of a mono-carboxylic acid. In the latter case, Q represents a group of the type of formyl, acetyl, proprionyl, etc. Other esters which serve as suitable sources of alkyl groups comprise esters of mineral acids such as the alkyl sulfates and alkyl esters of acids of phosphorus, which esters may also be considered as alkoxy compounds in the present instance. Other compounds which may be utilized as alkylating agents and can also be considered as alkoxy compounds are the glycols.

The different alkoxy compounds utilizable in the process of this invention may react with the aromatic hydrocarbon charged to produce alkylated aromatic hydrocarbons or they may produce olefinic compounds as intermediates, or at least as transient intermediates, during the course of reactions which result in the formation of alkylated aromatic hydrocarbons. Thus alcohols, particularly those containing at least 2 carbon atoms per molecule, and the corresponding ethers are capable of controlled dehydration or splitting reactions to form olefinic hydrocarbons, which may be considered as present in the reaction mixture, possibly only as transient intermediate compounds which react further with aromatic hydrocarbons to form mono-alkylated and more highly alkylated aromatic hydrocarbons.

Catalysts suitable for use in effecting the process of the present invention comprise pyrophosphates of heavy metals selected from the members of the right-hand column of group I of the periodic table. Preferred catalysts are the copper and silver salts of pyrophosphoric acid as well as the materials formed by mildly treating these pyrophosphates at elevated temperatures with hydrocarbons, hydrogen, or other reducing gases prior to use as alkylating catalysts. The term "heavy metal," as used herein, does not include sodium which has a specific gravity of about 0.97 at 20° C., but this term does include copper, silver, and gold although the last named metal is seldom used for this purpose because of its cost.

The metal pyrophosphates utilized as alkylating catalysts may be formed by adding an aqueous solution of an alkali metal pyrophosphate to an aqueous solution of a water-soluble copper or silver salt to effect precipitation of the desired metal pyrophosphate which may be separated by filtration from the precipitation mixture, then washed, dried, and formed into particles suitable for use as a reactor filling material.

Pyrophosphates of copper, silver, or mixtures thereof may be used as such or mixed with or deposited upon carriers or supporting materials such as silica, diatomaceous earth, alumina, magnesia, silica-alumina composites, crushed porcelain, pumice, firebrick, etc. A composite of a group I metal pyrophosphate or metal acid pyrophosphate and a selected carrier in finely powdered form after thorough mechanical mixing, is subjected to drying, pelleting, and heating operations, the latter carried out in a stream of air, nitrogen, hydrogen, or hydrocarbon gases to produce formed particles of catalyst suitable for use as packing material in a reactor employed for effecting alkylation of aromatics by alkoxy compounds, or the metal pyrophosphate itself may similarly be formed into pellets or granules usually by compressing a mixture of the powdered metal pyrophosphate and a suitable pelleting lubricant such as hydrogenated cocoanut oil, starch, etc. The activity of supported metal pyrophosphate catalysts is also controlled to a substantial extent by varying the proportions of active metal pyrophosphate and carrier. The different alkylating catalysts which may thus be prepared and employed in the present process are not necessarily equivalent in their action.

In effecting reaction between an aromatic hydrocarbon as benzene and an alkylating agent such as an alcohol, according to the process of the present invention, the exact method of procedure varies with the nature of the reacting constituents. A simple procedure, utilizable in the case of an aromatic hydrocarbon which is normally liquid, or if solid is readily soluble or easily dispersed in a substantially inert liquid, and an alcohol or other suitable olefin-producing substance consists in contacting the aromatic hydrocarbon and olefin-producing substance with a catalyst containing a pyrophosphate of a heavy metal selected from members of the right-hand column of group I of the periodic table maintained at a temperature of from about 200° to about 450° C. and preferably at a temperature of from about 250° to about 400° C. under a pressure of from substantially atmospheric to approximately 100 atmospheres. Intimate contact of the reacting components with the catalyst is effected by passing the reaction mixture through a fixed bed of granular or pelleted catalyst or the reacting components may be mixed with finely divided catalyst and reacted in either a batch or continuous type of operation. In the reaction mixture it is preferable to have present between about 2 and about 20 molecular proportions of aromatic hydrocarbon for each molecular proportion of alkoxy compound or other olefin-producing substance introduced thereto. By maintaining a substantial molar excess of aromatic hydrocarbon to olefin-producing substance throughout the entire reaction, it is possible to diminish the formation of olefin polymers and to favor the production of mono-alkyl aromatic compounds with relatively small formation of more highly alkylated materials. The addition of a hydrogen-containing gas to the alkylation mixture frequently has a beneficial effect upon the reaction.

In a typical operation of the process of this invention, a normally liquid aromatic hydrocarbon and a normally liquid alkoxy compound are charged simultaneously to a reactor containing a pyrophosphate catalyst of the class herein described, maintained at a temperature preferably of between about 250° and about 400° C. and under a pressure usually of from about 10 to about 100 atmospheres. Also a portion of the aromatic hydrocarbon such as benzene may be charged to a reactor containing a fixed bed of solid catalyst while a fraction containing an alkoxy compound, such as ethyl alcohol, is introduced at various points between the inlet and the outlet of the reaction zone in such a manner that the reaction mixture being contacted with the catalyst will at all times contain a relatively low proportion of the alkoxy compound and thus favor the formation of mono-alkylated aromatic hydrocarbons rather than more highly alkylated aromatic hydrocarbons. The gradual introduction of an olefin-producing substance throughout the reaction zone also has a tendency to diminish the formation of olefin polymers which sometimes occurs when alkoxy compounds, as alcohols and ethers, undergo dehydration reactions in the presence of the catalysts herein described.

While the method of passing the aromatic and alkoxy compounds, either together or countercurrently, through a suitable reactor containing the granular catalyst is generally customary procedure, the interaction of these organic compounds may also be effected in a closed vessel in which the reacting components are in liquid or vapor phase and in which the catalyst is preferably in finely divided or powdered form and is maintained in dispersion or suspension by some method of agitation. The choice of operating procedure is dependent upon the circumstances such as the temperature, pressure, and activity of the catalyst found to be effective for producing the desired reaction between particular mono-nuclear or poly-nuclear aromatic hydrocarbons and alkoxy compounds, the latter comprising compounds such as aliphatic alcohols, ethers, and esters.

Metal pyrophosphates as herein described, are preferred catalysts as they permit continuous reaction of aromatic hydrocarbons with alkoxy compounds in the presence of a fixed bed of catalyst and thus make it possible to avoid mechanical problems as well as oxidation and corrosion difficulties encountered when this reaction is carried out in the presence of sulfuric acid which is sometimes used as an alkylating catalyst. Further, a pyrophosphate of copper or silver also has the advantage over aluminum chloride utilized as catalyst for alkylating aromatic compounds with alkoxy compounds in that the metal pyrophosphate forms substantially no addition compounds or complexes with aromatic hydrocarbons and alkoxy compounds while such formation of addition compounds is characteristic of catalysts containing aluminum chloride.

The reaction products obtained by treating an aromatic hydrocarbon with an alkoxy compound according to the process of this invention consist of hydrocarbons together with certain amounts of water or organic acid. The product contains water in case the alkoxy compound is an alcohol or an ether, while an organic acid is present when the alkoxy compound charged consists of an alkyl ester of an organic acid.

In general, the hydrocarbon products formed by interaction of an alkoxy compound with a molar excess of an aromatic hydrocarbon are separated from the unreacted aromatic hydrocarbon by suitable means as by distillation, and the unreacted portion of the aromatic hydrocarbon originally charged, and generally the poly-alkylated aromatic hydrocarbons formed, are returned to the process and mixed with additional quantities of the aromatic hydrocarbon and alkoxy compound being charged to contact with the catalyst. This recycling of poly-alkylated aromatic hydrocarbons sometimes aids in the production of mainly mono-alkylated aromatic hydrocarbons and in depressing the formation of more highly alkylated derivatives. The total alkylated product thus freed from the excess of the originally charged aromatic hydrocarbon is separated into desired fractions by distillation at ordinary or reduced pressure or by other suitable means.

The process of this invention is particularly applicable to the production of mono ethylbenzene by the alkylation of benzene with ethyl alcohol at a temperature preferably between about 250° and about 400° C. under a pressure of from about 10 to about 100 atmospheres. Under these conditions, a portion of the ethyl alcohol reacts with benzene forming mainly mono ethylbenzene and relatively small amounts of more highly alkylated benzene while another portion of the alcohol undergoes dehydration to form ethylene which can also undergo reaction with benzene in the presence of catalyst to produce ethylbenzene. Ethylene present in the reaction products may be dissolved in the excess of benzene and the resultant solution of ethylene in benzene may be recycled to the alkylation zone after separation therefrom of the desired mono ethylbenzene and water.

The following examples are given to illustrate the results obtainable by the use of the present process, although these examples are not introduced with the intention of unduly restricting the generally broad scope of the invention.

Example I

A solution of 53 parts by weight (0.14 molecular proportion) of potassium pyrophosphate trihydrate in 600 parts by weight of water was added gradually with stirring over a period of 15 minutes to a second solution containing 63 parts by weight (0.25 molecular proportion) of copper sulfate pentahydrate dissolved in 1250 parts by weight of water. The precipitate so formed was washed by decantation three times using 1000 parts by weight of water in each wash. The precipitated material was then collected on a filter, washed again with 1000 parts by weight of water, and afterward dried for 16 hours at 140° to 145° C. Thus 38 parts by weight of light blue powdery copper pyrophosphate was obtained which represented 90% of the theoretical yield based upon the quantity of potassium pyrophosphate used in the precipitation.

The excess copper sulfate remaining in the mother liquor after precipitation of the copper pyrophosphate could be treated with more potassium pyrophosphate to produce an additional quantity of copper pyrophosphate.

10 parts by weight of copper pyrophosphate prepared as hereinabove indicated, 80 parts by weight of benzene, and 20 parts by weight of isopropyl alcohol are charged to a steel autoclave which is then heated for 4 hours at 350° C. under a pressure of about 50 atmospheres. After the reaction, the autoclave is cooled to room temperature, the reaction product is removed therefrom, and separated by fractional distillation into excess benzene, 35 parts by weight of mono isopropyl benzene, and 5 parts by weight of more highly propylated benzenes.

Example II

A copper pyrophosphate catalyst is prepared as described in Example I and then formed into 3 x 3 mm. cylindrical particles by means of a pelleting machine. The pelleted catalyst is employed as a filler in a steel tubular reactor through which is passed benzene and ethyl alcohol in the respective molecular proportions of 4 to 1 at a temperature of 350° C. and under a pressure of 25 atmospheres. The charging rates of benzene and ethyl alcohol are so controlled that about 1 liquid volume of benzene-alcohol mixture is charged per hour per volume of catalyst present in the reactor. This treatment results in the formation of mono ethylbenzene, more highly alkylated benzenes, ethylene, and water; the hydrocarbon materials being recovered in admixture with the excess of benzene charged to the process. The water is separated from the hydrocarbon mixture which is then fractionally distilled to remove ethylene and benzene from ethylated benzenes. The ethylene and benzene are recycled to further contact with the catalyst while the ethylated benzenes are separated into mono ethylbenzene and more highly ethylated benzenes.

The nature of the present invention and its commercial utility are evident from the specification and examples given, although neither section is intended to limit unduly its generally broad scope.

I claim as my invention:

1. A process for producing aromatic hydrocarbons having a higher number of carbon atoms per molecule than the aromatic hydrocarbon from which they are derived, which comprises subjecting an aromatic hydrocarbon to contact with an alkoxy compound under alkylating conditions in the presence of a catalytically effective amount of a pyrophosphate of a heavy metal selected from the members of the right-hand column of group I of the periodic table.

2. A process for producing alkylated aromatic hydrocarbons which comprises subjecting an aromatic hydrocarbon and an alkoxy compound to contact under alkylating conditions in the presence of a catalytically effective amount of a pyrophosphate of a heavy metal selected from the members of the right-hand column of group I of the periodic table.

3. A process for producing alkylated aromatic hydrocarbons which comprises subjecting an aromatic hydrocarbon and an alkoxy compound to contact at a temperature of from about 200° to about 450° C. in the presence of a catalytically effective amount of a pyrophosphate of a heavy metal selected from the members of the right-hand column of group I of the periodic table.

4. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 100 atmospheres in the presence of a catalytically effective amount of a pyrophosphate of a heavy metal selected from the members of the right-hand column of group I of the periodic table.

5. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 100 atmospheres in the presence of a hydrogen-containing gas and of a catalytically effective amount of a pyrophosphate of a heavy metal selected from the members of the right-hand column of group I of the periodic table.

6. A process for producing alkylated aromatic hydrocarbons which comprises subjecting an aromatic hydrocarbon and an aliphatic alcohol to contact at a temperature of from about 200 to about 450° C. in the presence of a catalyst comprising essentially a pyrophosphate of a heavy metal selected from the members of the right-hand column of group I of the periodic table.

7. A process for producing alkylated aromatic hydrocarbons which comprises subjecting an aromatic hydrocarbon and an aliphatic ether to contact at a temperature of from about 200° to about 450° C. in the presence of a catalyst comprising essentially a pyrophosphate of a heavy metal selected from the members of the right-hand column of group I of the periodic table.

8. A process for producing alkylated aromatic hydrocarbons which comprises subjecting an aromatic hydrocarbon and an alkyl ester of a carboxylic acid to contact at a temperature of from about 200° to about 450° C. in the presence of a catalyst comprising essentially a pyrophosphate of a heavy metal selected from the members of the right-hand column of group I of the periodic table.

9. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 100 atmospheres in the presence of a catalyst comprising essentially copper pyrophosphate.

10. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 100 atmospheres in the presence of a catalyst comprising essentially silver pyrophosphate.

11. A process for producing alkylated aromatic hydrocarbons which comprises subjecting an aromatic hydrocarbon and an aliphatic alcohol to contact at a temperature of from about 200° to about 450° C. in the presence of a catalyst comprising essentially copper pyrophosphate.

12. A process for producing ethylated benzene which comprises subjecting benzene and an ethoxy compound to contact at a temperature of from about 200° to about 450° C. under a pressure of from substantially atmospheric to approximately 100 atmospheres in the presence of a catalyst comprising essentially a pyrophosphate of a heavy metal selected from the members of the right-hand column of group I of the periodic table.

13. A process for producing ethylated benzene which comprises subjecting benzene and an ethoxy compound to contact at a temperature of from about 200° to about 450° C. under a pressure of from substantially atmospheric to approximately 100 atmospheres in the presence of a catalyst comprising essentially copper pyrophosphate.

14. A process for producing ethylated benzene which comprises subjecting benzene and ethyl alcohol to contact at a temperature of from about 200° to about 450° C. under a pressure of from substantially atmospheric to approximately 100 atmospheres in the presence of a catalyst comprising essentially copper pyrophosphate.

15. A process for producing propylated benzene which comprises subjecting benzene and a propyl alcohol to contact at a temperature of from about 200° to about 450° C. under a pressure of from substantially atmospheric to approximately 100 atmospheres in the presence of a catalyst comprising essentially copper pyrophosphate.

16. A process for producing alkylated aromatic hydrocarbons which comprises subjecting an aromatic hydrocarbon and an alkoxy compound to contact at a temperature of from about 200° to about 450° C. in the presence of a catalyst comprising essentially a pyrophosphate of a heavy metal selected from the members of the right-hand column of group I of the periodic table.

17. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 100 atmospheres in the presence of a catalyst comprising copper pyrophosphate as its essential active ingredient.

18. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 100 atmospheres in the presence of a catalyst comprising essentially a composite of copper pyrophosphate and a carrier.

19. A process for producing a mono-alkylated hydrocarbon which comprises alkylating an aromatic hydrocarbon with an alkoxy compound in the presence of a catalytically effective amount of a pyrophosphate of a heavy metal from the right-hand column of group I of the periodic table, thereby forming mono-alkylated and poly-alkylated aromatic hydrocarbons, separating the mono-alkylated from the poly-alkylated hydrocarbons, and returning at least a portion of the poly-alkylated aromatic hydrocarbons to the alkylating step.

RAYMOND E. SCHAAD.